United States Patent [19]

Hundebøl

[11] Patent Number: 5,131,292
[45] Date of Patent: Jul. 21, 1992

[54] SPINDLE DRIVE

[75] Inventor: Keld O. Hundebøl, Ansager, Denmark

[73] Assignee: HH Patent A/S, Ansager, Denmark

[21] Appl. No.: 699,178

[22] Filed: May 13, 1991

[30] Foreign Application Priority Data

May 22, 1990 [DK] Denmark .............................. 1270/90

[51] Int. Cl.$^5$ ............................................. F16H 37/06
[52] U.S. Cl. .................................................. 74/665 H
[58] Field of Search .............. 74/417, 665 H, 665 GB, 74/665 D

[56] References Cited

U.S. PATENT DOCUMENTS

| | | | |
|---|---|---|---|
| 907,058 | 12/1908 | Kraemer et al. | 51/176 |
| 1,451,060 | 4/1923 | Stuting | 74/665 H |
| 1,879,139 | 9/1932 | Eddy | 74/665 H |

FOREIGN PATENT DOCUMENTS

| | | | |
|---|---|---|---|
| 151540 | 7/1937 | Fed. Rep. of Germany | 74/665 H |
| 359463 | 5/1938 | Italy | 74/665 H |
| 56-3347 | 1/1981 | Japan | 74/665 H |
| 21998 | 5/1905 | Sweden | |
| 102156 | 7/1941 | Sweden | |
| 128675 | 7/1919 | United Kingdom | 74/665 H |
| 473229 | 3/1937 | United Kingdom | 74/665 H |
| 2141648 | 1/1985 | United Kingdom | |

OTHER PUBLICATIONS

Vinematics and Dynamics of Machines by G. H. Martin; McGrawy-Hill Co.

*Primary Examiner*—Rodney H. Bonck
*Assistant Examiner*—Ryan W. Massey
*Attorney, Agent, or Firm*—Darby & Darby

[57] ABSTRACT

In order to achieve a compact spindle drive which is also lightweight and consisting of few components, and where the drive motor (8) is mounted in a stationary manner in relation to the spindle drive, the spindle drive according to the invention is configured with two sets of bevel gears comprising a first larger pair of gears (11, 13) and a second smaller pair of gears (12, 14).

The spindles (15, 17) can hereby be mounted in star formation in the housing and alternately enter into engagement with the first gear (11) and the second gear (12), and thus alternatively rotate the one way and the other way.

At the same time, all of the spindles (15, 17) are suspended in the same plane, whereby a very uniform machining operation is achieved.

Finally, the housing can be provided with a turning motor (21), which via a pinion (2, 19) can revolve the housing (1) at the same time that the spindles rotate.

6 Claims, 1 Drawing Sheet

SPINDLE DRIVE

BACKGROUND OF THE INVENTION

The invention relates to a spindle drive with a number of spindles which extend radially in relation to the drive, and where the drive is provided with a turning arrangement for turning around an axis of rotation as well as a driving arrangement for simultaneous rotation of the spindles around axes, all of which intersect the axis of rotation at right-angles.

Drives of this kind are used especially for tools which are to carry out the surface treatment of an item, and said tools can be of the sanding type with either fixed or flexible sanding elements.

In the processing of wood, for example surface finishing, flexible tools in the form of sanding rollers are used, where the sanding material is in the form of sanding brushes or blades, preferably of the same length, which extend radially from a core.

When mounted in such a drive, a suitable number of tools mounted on the spindles will not only be revolved but also rotated over the item, whereby there is achieved an efficient and uniform finishing of the surface due to the relatively large number of sanding elements which sand the items evenly from several different directions.

Hitherto-known spindle drives for such purposes are either provided with a friction drive or with a direct drive to each of the spindles by means of an electric motor.

The friction drive comprises two friction disks mounted in parallel on the same spindle, and against which friction wheels at the end of each spindle can enter into engagement either randomly or permanently with either the one or the other of the friction disks. The direction of rotation of the spindles is hereby determined, in that the one friction engagement provides one direction of rotation, while the other provides the opposite direction.

In order to be able to build such a drive together in one unit a maneuvering possibility is demanded for the raising or lowering of the friction disks against the friction wheels. This not only necessitates a relatively complicated maneuvering arrangement, but also that the spindles are at different levels, depending on whether it is the upper or the lower friction disk with which the spindle is in engagement.

When an electric motor is mounted for the rotation of each spindle, each motor must also be revolved during operations, which results in a relatively large and heavy drive for reasons of the motors and the belt drives required for this purpose.

SUMMARY OF THE INVENTION

It is the object of the invention to these drawbacks and disadvantages of the known spindle drives, and this object is achieved according to the invention by a drive where the the driving arrangement of said drive comprises a shaft with a first bevel gear which is in engagement with bevel gears on some of the spindle axles, and with a second bevel gear displaced on the axle at a distance from the first gear and the teeth of which second gear facing towards the teeth of the first gear, whereby said second gear is in engagement with bevel gears on the remaining spindle axles.

What is achieved first and foremost is that the drive can be configured as a closed, compact unit with very low friction, and thus energy requirement while at the same time providing the possibility for a completely smooth drive, i.e. completely without vibrations.

In addition hereto, all of the parts can be accommodated in one housing, thus enabling a closed construction so that the drive can function in all working positions, in that the necessary lubrication exists on a permanent basis. Consequently, the drive will be almost maintenance-free, and the result of the machining is of a high quality as there are no irregularities in the moving parts.

By allowing the spindles to have two bevel gears of different diameters corresponding to two driving bevel gears, it will be possible between two gears with large pitch diameters to insert one wit a smaller pitch diameter, whereby there is achieved a particularly compact unit with the possibility of machining close to the drive itself, since the radial extension of the drive is relatively small.

By mounting spindles alternately with a gear with a large and a smaller pitch diameter around the central axis of rotation, the spindles will rotate in opposite directions in relation to the adjacent spindles, which results in an efficient and uniform machining.

Finally, it is expedient to mount both the drive motor and the turning motor on a fixed part, in that this enables permanent electrical connections to be used for these motors, which therefore do not form part of the moving parts.

The invention will now be described in closer detail with reference to the drawing, where

DESCRIPTION OF THE PREFERRED EMBODIMENT

Figure 1:
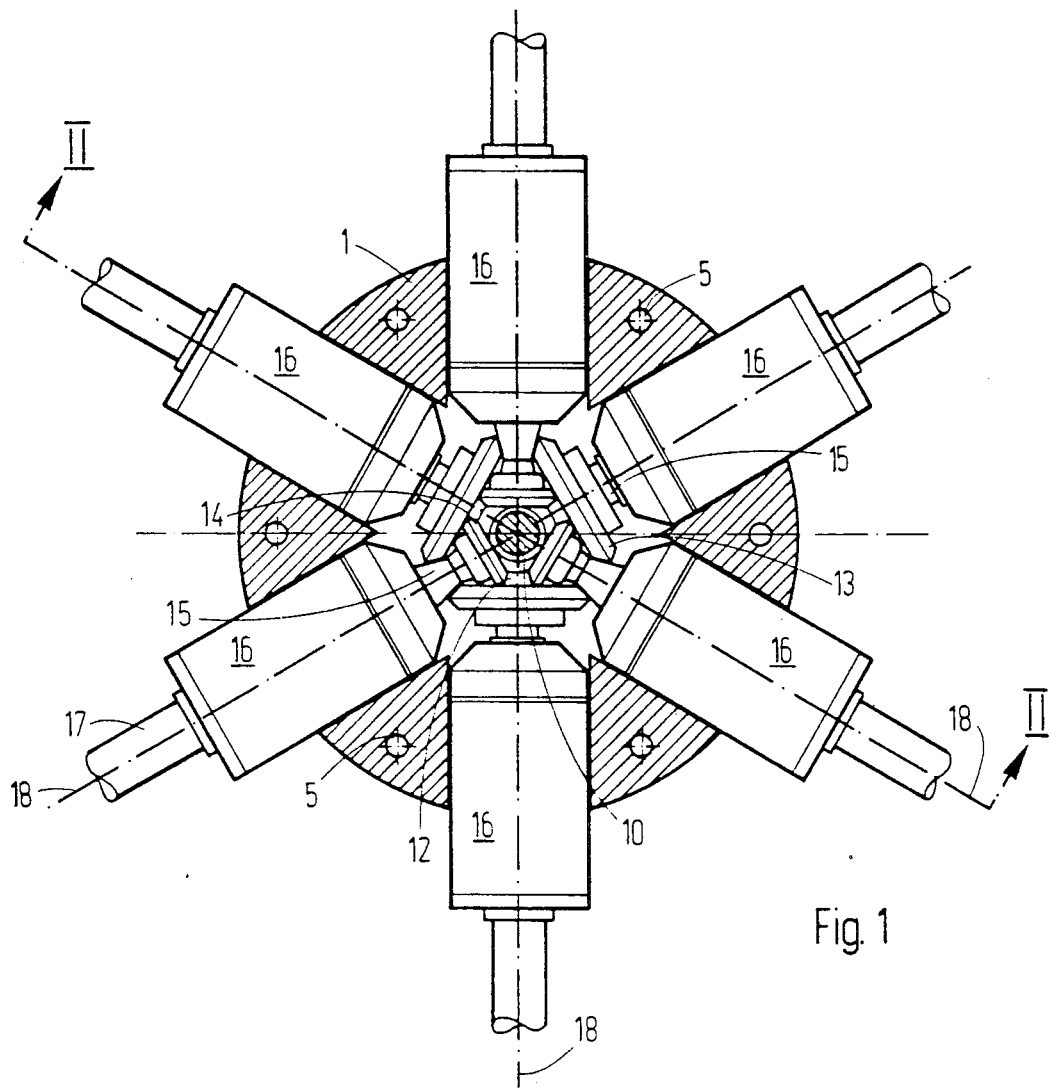
FIG. 1 shows a spindle drive according to the invention with six spindles, seen in a part-section I—I in FIG. 2.
Figure 2:
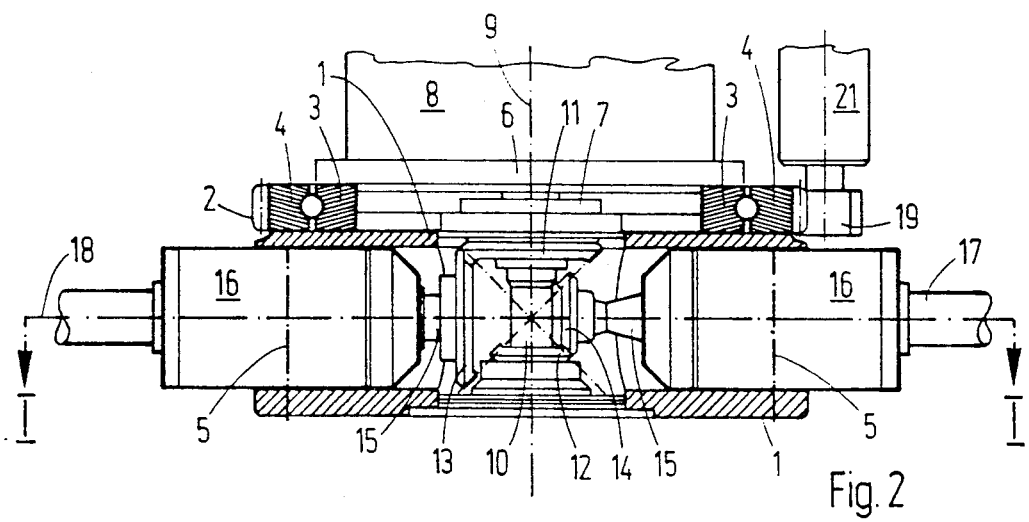
FIG. 2 shows the spindle drive in section seen in the direction II—II in FIG. 1.

In FIGS. 1 and 2 is seen an example of an embodiment in which the drive is provided with six spindles which extend radially outwards from the actual drive housing 1, so that the axis of rotation 18 of the individual spindle axles 17 forms an angle of 60° to the adjacent axes 18.

The housing 1 itself is cylindrical and comprises a base part with a lower bearing 7 for a drive shaft 10, and a centre-piece with through-going bores for six bearing housings 16 for the spindle axles 15, 17.

The housing also has an upper part with an upper bearing 7 for the drive shaft 10. On the upper part there is also mounted a ring gear 2 which extends along the circumference of the housing and has an outer bearing ring 4 on its internal side. Both the ring gear 2 and the bearing ring 4 are bolted together with the underpart by means of bolts 5, as indicated in the drawing.

For cooperation with the outer bearing ring 4, an inner bearing ring 3 is mounted on a fixed mounting part 6, so that the housing 1 can be turned in relation to the fixed part 6.

The actual gearing exchange is mounted inside the housing. This comprises a shaft 10 extending into the bearings 7 and on which are mounted two bevel gears. The first gear 11, which in the shown example is mounted uppermost, has a greater pitch diameter than the underlying gear 12. For engagement with the upper gear 11 there are three bevel gears 13. These are mounted at the ends of three spindle axles 15, said axles forming a mutual angle of 120° as shown in FIG. 1.

In a corresponding manner, for engagement with the lower gear 12 there are three corresponding gears 14 mounted on the remaining three spindle axles 15, and the construction makes it possible for these three smaller gears 14 to be positioned between the larger gears 13.

By having the same pitch diameter on the cooperating gears 11, 13, respectively 12, 14, and the same number of teeth, the result is that all of the spindles 17 have the same speed of rotation and, moreover, that their direction of rotation is opposite to that of their adjacent spindles. It is also ensured that all of the spindles 17 rotate and are turned in the same plane, which contributes towards an optimum working result.

The drive shaft 10 is connected to an electric motor 8 which is mounted on a fixed part 1 concentrically with the centre axis 9 of the drive.

For the turning of the drive, on the fixed part 6 there is also mounted an electric motor 21 with a gear 19 which is in engagement with the teeth of the ring gear 2.

Sanding rollers or disks (not shown) can be mounted on the spindles 17 in a commonly-known manner. During operations, said rollers or disks will alternately rotate in a direction which will depend on which set of gears 12, 14 or 11, 13 are involved. At the same time, the drive is turned, whereby the final machining movement is a composite movement comprising a turning of several spindles in the same plane or level, and where the individual spindles constantly rotate alternately in the one or the other direction.

The drive can be completely closed so that it is permanently lubricated, and thereby almost maintenance-free and without risk of being contaminated. Furthermore, it is particularly reliable, free of vibration and noise, and with such a compact configuration that a high degree of finishing is achieved while the energy requirements for both starting and operations are low.

I claim:

1. A spindle drive comprising:
    a number of spindles which extend radially in relation to the drive,
    means for turning the drive around an axis of rotation,
    a driving arrangement for simultaneous rotation of the spindles around their axes, all of which intersect the axis of rotation at right-angles, comprising
        a shaft with a first bevel gear which is in engagement with bevel gears on some of the spindle axles, and
        a second bevel gear having different pitch diameter then said first bevel gear disposed at a distance on the shaft from the first bevel gear and with the teeth facing towards the teeth on the first gear, said second gear being in engagement with bevel gears on the remaining spindle axles,
    the driven gears of the spindles having the same pitch diameters of the driving gears on the shaft.

2. Spindle drive according to claim 1, wherein the gears on the spindles are alternately engaged with the first and the second bevel gears respectively.

3. Spindle drive according to claim 1, wherein the spindles are suspended in bearings in a housing which is provided externally with a ring gear, said housing being mounted on bearings on a fixed part in which the drive shaft is suspended and where a drive motor and a turning motor are mounted, the turning motor has a driving gear being engaged with the ring gear for the turning of the housing around the axis of rotation.

4. Spindle drive comprising a number of spindles which extend radially in relation to the drive,
    means for turning the drive around an axis of rotation,
    a driving arrangement for simultaneous rotation of the spindles around their axes, all of which intersect the axis of rotation at right-angles, comprising
        a shaft with a first bevel gear which is in engagement with bevel gears on some of the spindle axles, and
        a second bevel gear having different pitch diameter then said first bevel gear disposed at a distance on the shaft from the first bevel gear and with the teeth facing towards the teeth on the first gear, said second bevel gear being in engagement with bevel gears on the remaining spindle axles,
        the driven gears of the spindles having the same pitch diameters of the driving gears on the shaft,
    wherein the spindles are suspended in bearing in a housing which is provided externally with a ring gear, said housing being mounted on bearings on a fixed part in which the drive shaft is suspended and where a drive motor and a turning motor are mounted, and where the turning motor has a driving gear engaged with the ring gear for the turning of the housing around the axis of rotation.

5. Spindle drive according to claim 4, characterized in that the gears on the spindles are alternately engaged with the first and the second bevel gears respectively.

6. A spindle drive comprising:
    a number of spindles which extend radially in relation to the drive,
    means for turning the drive around an axis of rotation,
    a driving arrangement for simultaneous rotation of the spindles around their axes, all of which intersect the axis of rotation at right-angles, comprising
        a shaft with a first bevel gear which is in engagement with bevel gears on some of the spindle axles, and
        a second bevel gear having different pitch diameter then said first bevel gear disposed at a distance on the shaft from the first bevel gear and with the teeth facing towards the teeth on the first gear, said second gear being in engagement with bevel gears on the remaining spindle axles,
    the spindles are suspended in bearings in a housing which is provided externally with a ring gear, said housing being mounted on bearings on a fixed part in which the drive shaft is suspended and where a drive motor and a turning motor are mounted, the turning motor having a driving gear engaged with the ring gear for the turning of the housing around the axis of rotation.

* * * * *